United States Patent [19]
Thompson et al.

[11] 3,848,174
[45] Nov. 12, 1974

[54] HIGH VOLTAGE SOLID-STATE RECTIFIER SYSTEM

[75] Inventors: Chester C. Thompson, Roslyn Heights; Severt E. Olsen, Staten Island; Raymond J. Loby, Plainview, all of N.Y.

[73] Assignee: Radiation Dynamics, Inc., Westbury, L.I., N.Y.

[22] Filed: May 21, 1973

[21] Appl. No.: 362,060

[52] U.S. Cl. .................. 321/11, 315/36, 321/14, 321/15, 321/27 R, 317/31
[51] Int. Cl. .............................. H02m 1/18
[58] Field of Search ............... 321/8 R, 15, 11–14, 321/27 R; 317/61, 69, 70; 315/36, 31, 43

[56] References Cited
UNITED STATES PATENTS

| | | | |
|---|---|---|---|
| 2,875,394 | 2/1959 | Cleland | 321/15 |
| 3,230,459 | 1/1966 | Loya | 321/11 X |
| 3,246,230 | 4/1966 | Cleland | 321/15 |
| 3,356,894 | 12/1967 | Lafferty | 315/36 X |
| 3,505,533 | 4/1970 | Bernstein et al. | 321/15 X |
| 3,581,106 | 5/1971 | Peoples et al. | 321/15 X |
| 3,723,846 | 3/1972 | Thompson, Jr. | 321/15 |

*Primary Examiner*—William M. Shoop, Jr.
*Attorney, Agent, or Firm*—Rose & Edell

[57] ABSTRACT

A high voltage solid-state rectifier includes multiple series connected ac-compensated diodes and series buffer resistors in a stepped spiral stack. The stack is encased in a sectionalized faraday shield which provides 360° isolation from external rf electrostatic fields and provides external capacitance grading along the stack. Spark gaps between shield sections prevent excessive voltage build-up due to electrical discharges and are arranged in line of sight of each other to permit the ultra-violet light produced from one spark gap firing to stimulate the firing of the other spark gaps. A trigger spark-gap derives its voltage from an inductance in series with the solid-state rectifier. Any electrical discharges which result in an excessive voltage appear initially across the inductance, firing the trigger spark gap which in turn initiates the other spark gaps to fire by ultra-violet stimulation.

20 Claims, 7 Drawing Figures

3,848,174

HIGH VOLTAGE SOLID-STATE RECTIFIER SYSTEM

BACKGROUND OF THE INVENTION

The present invention relates to high voltage solid state rectifiers and, more particularly, to the protection and structural design of such rectifiers for operation in response to rf voltage in a megavolt environment. Although described herein as utilized in a particle accelerator, the rectifier of the present invention has utility in other equipment utilizing rectification to obtain high dc voltages.

The Dynamitron particle accelerator (manufactured by Radiation Dynamics, Inc., Westbury, N.Y.; ref: U.S. Pat. Nos. 2,875,394 and 3,246,230, both to Cleland) employs a voltage multiplication circuit which includes a series of rectifiers to convert rf voltage to high dc voltage. In the Dynamitron, as in any high voltage equipment, the primary cause for component failure is the damage resulting from an electrical discharge or spark. When an electrical discharge occurs, any rectifier can be subjected to a voltage well in excess of its rated voltage. Since there is no practical way in which such discharges or sparks can be completely eliminated, accelerator components, including the rectifiers, must be constructed to prevent damage when discharge occurs. In addition, since the primary ac power for the voltage multiplication circuit is at radio frequency, the rectifiers must be sufficiently isolated from the strong electrostatic fields produced by the rf.

It is therefore an object of the present invention to provide a solid state high voltage rectifier which can operate without damage in a high voltage environment which is subject to electrical discharges and electrostatic fields.

It is another object of the present invention to provide a compact, solid state high voltage rectifier assembly which is protected against damage by discharge occurring in a high voltage environment.

SUMMARY OF THE INVENTION

In accordance with the principles of the present invention, a solid-state high-voltage rectifier comprises multiple series-connected ac-compensated diodes and series buffer resistors arranged in a stepped spiral stack. The stack is encased in a faraday shield which extends along the length of the stack to provide isolation from external rf-induced electrostatic fields. The faraday shield is segmented into plural longitudinal shield sections which overlap in spaced relationship at their junctions to provide capacitance grading for the rectifier assembly along its length.

Spark gaps are provided from shield to shield to prevent excessive voltage build-up due to electrostatic discharges. The spark gaps are arranged in line of sight of one another along the length of the stack in order that the ultra-violet light produced when one spark gap fires can stimulate firing of the other spark gaps. A trigger spark gap, connected across an inductor which is in series with the diode stack, fires in response to over voltage appearing across the inductor and in turn initiates firing of the other spark gaps.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein.

DESCRIPTION OF PREFERRED EMBODIMENTS

Figure 1:
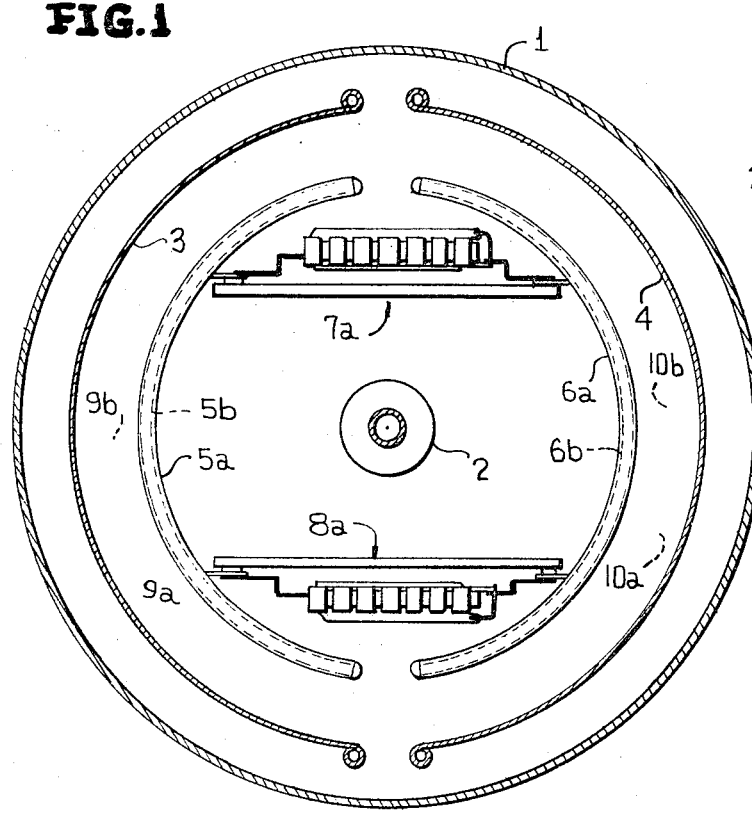
FIG. 1 is a partially schematic cross-sectional view taken perpendicular to the longitudinal axis of a particle accelerator employing the high-voltage, solid-state rectifier of the present invention in its voltage multiplication circuit.

Referring specifically to FIG. 1 of the accompanying drawings, there is illustrated in section a Dynamitron particle accelerator, such as described in U.S. Pat. Nos. 2,875,394 and 3,246,230, which patents are incorporated herein by reference. The accelerator includes an electrically-grounded steel container 1 which is of cylindrical configuration and is maintained pressure-tight. Enclosed within container 1 and extending substantially along the longitudinal axis of the container is an accelerator tube 2. A pair of opposed, spaced electrodes 3 and 4 are configured in the form of respective semi-cylindrical shells extending substantially concentrically about accelerator tube 2 and within container 1. Electrodes 3 and 4 are connected to respective terminals of a source of rf voltage (not shown) in the manner described in the above-referenced patents. For example, the rf voltage may typically be 10,000 volts or more at a frequency in the range on the order of 20 kHz to 200 kHz.

A series of substantially semi-circular corona shields 5a, 5b, etc., are spaced along one side of the axis of container 1, each corona shield 5a, 5b, etc., positioned concentrically about the container axis between electrode 3 and accelerator tube 2. A corresponding series of like corona shields 6a, 6b, etc., are spaced along the opposite side of the container axis and positioned concentrically about that axis. The ends of corona shields 5a, 5b, etc., are spaced from respective ends of corona shields 6a, 6b, etc.

The voltage multiplication circuit for the particle accelerator includes two rows 7 and 8 of rectifier assemblies extending along the axis of container 1. Specifically, one row extends along one side of accelerator tube 2 and includes rectifier assemblies 7a, 7b, etc., with only 7a being illustrated in FIG. 1 to avoid obscuring the details of the invention. The second row of rectifier assemblies extends along the container on the opposite side of accelerator tube 2 and includes assemblies 8a, 8b, etc., with only assembly 8a being illustrated in FIG. 1. Each rectifier assembly physically extends between and is electrically connected to a respective pair of opposed corona shields 5 and 6. Thus, rectifier assembly 7a is connected in series between corona shields 5a and 6a and extends therebetween; rectifier assembly 8a is connected between corona shields 6a and 5b and extends therebetween; rectifier assembly 7b (not illustrated) is connected in series between corona shields 5b and 6b extends therebetween; etc. The various rectifier assemblies are thus connected in series, in a zig-zag physical configuration along the length of accelerator tube 2.

The rf voltage applied between electrodes 3 and 4 establishes an electrostatic field between those electrodes. This field is utilized to supply ac power to drive the rectifier assemblies 7, 8 in the particle accelerator. Specifically, the electrostatic field acts, via interelectrode capacitances between the electrodes and corona shields, to apply substantially the same ac voltage across each opposed corona shield pair. These interelectrode capacitances are illustrated in phantom in FIG. 1 and include capacitor 9a (between electrode 3 and corona shield 5a), capacitor 9b (between electrode 3 and corona shield 5b), capacitor 10a (between electrode 4 and corona shield 6a), capacitor 10b (between electrode 4 and corona shield 6b), etc.

Figure 2:
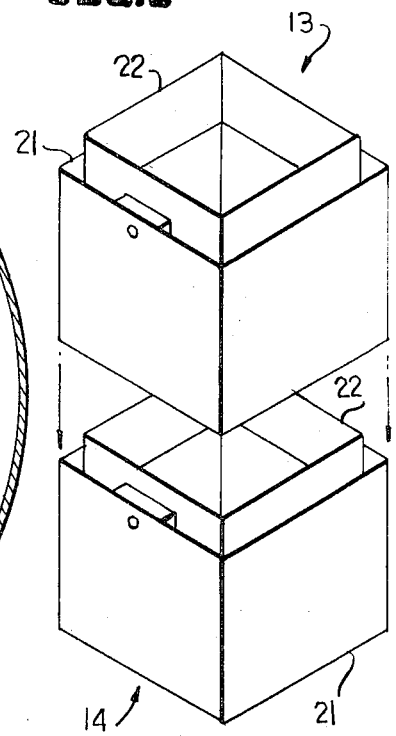
FIG. 2 is a view in perspective of two shield sections of the rectifier, illustrating the physical interrelationship between such sections.
Figure 3:
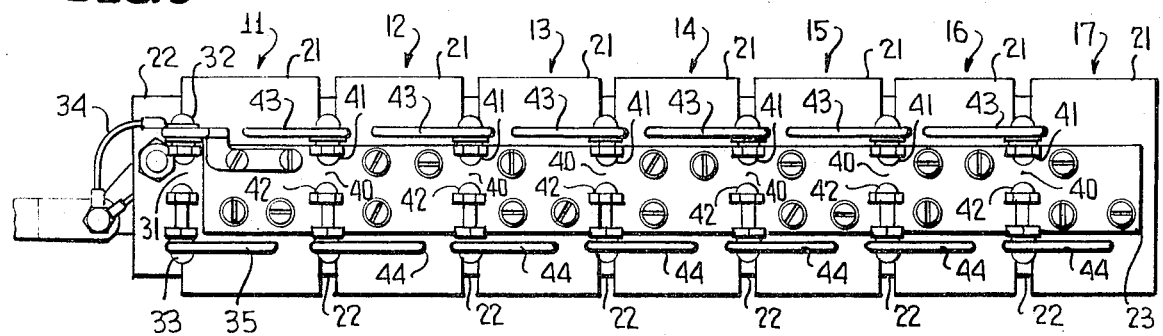
FIG. 3 is a top view in plan of a rectifier assembly according to the present invention.
Figure 4:
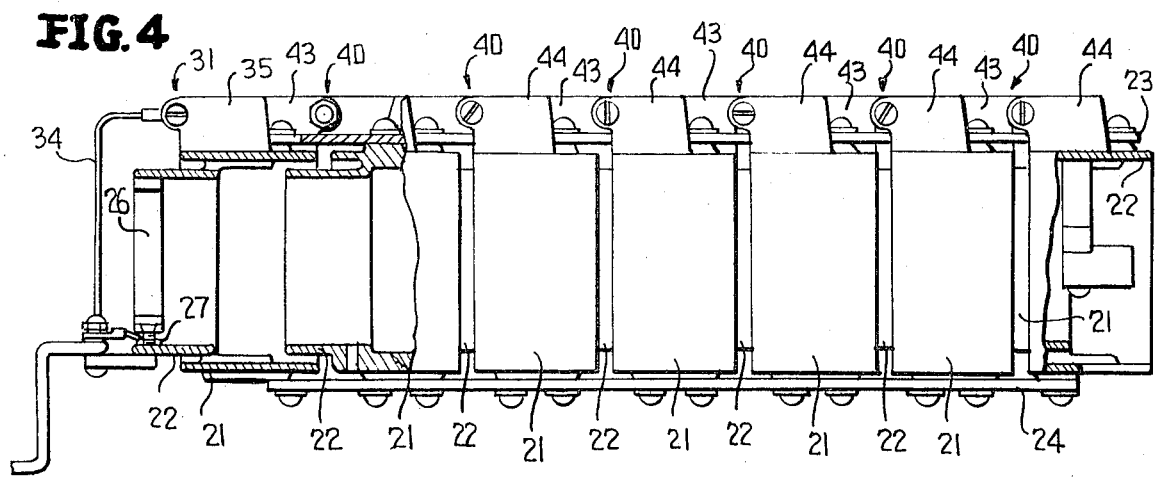
FIG. 4 is a side view in plan of the rectifier assembly of FIG. 3.

Referring now to FIGS. 2, 3 and 4 of the accompanying drawings, the rectifier assembly (7, 8 of FIG. 1) of the present invention is housed in seven faraday shield sections 11 through 17, inclusive, although the number of such sections can be varied. The shield sections are hollow and include an electrically conductive outer wall 21 of generally square cross-sectional configuration. An electrically conductive inner wall 22, also of square cross-section and disposed concentrically within outer wall 21, projections from one end of each shield section. Inner wall 22 is secured and electrically connected to the interior surface of outer wall 21.

Shield sections 11–17 are aligned end to end between two insulating strips 23, 24 to which each shield section is secured by screws or the like. The outer walls 21 of adjacent shield sections are spaced by less than the distance by which inner wall 22 projects from the end of the outer wall. Thus inner wall 22 of one shield section (for example, section 14) projects into the hollow region at the adjacent end of the next shield section (for example, section 13). Importantly, the inner wall 22 projects into the hollow region of the next shield section without contacting that next section. This spaced overlapping between adjacent shield sections establishes a capacitance between each adjacent pair of shield sections, which capacitance is described in greater detail with reference to FIG. 7. In addition, the overlapping provided by inner walls 22 results in continuous shielding for the components inside the shield sections along the length of the assembly, even though the outer walls 21 of adjacent shield sections are spaced.

It is possible to design the assembly so that the inner walls of the shield sections are provided only on two sides. The disadvantage of this arrangement, however, is that it provides less effective shielding and requires a greater length of overlap to achieve the capacitance provided by a shorter overlap with a four-sided inner wall. This latter factor permits an assembly employing the four-sided inner wall arrangement to be approximately half the length and occupy about one-third the volume of the two-sided arrangement. In a typical assembly used in the Dynamitron, each rectifier assembly of the present invention is 12 inches in length and has a 2 ½ inch square cross-section.

The input connection to the rectifier assembly (i.e. from the appropriate corona shield) terminates at one end of an rf choke or inductor 26, the other end of which is connected to inner wall 22 of shield section 11. Inductor 26 is actually supported between opposed surfaces of wall 22 but is electrically connected to only one of these surfaces; the input end of inductor 26 is insulated from wall 22 by means of insulative bushing 27. The function of inductor 26 in the rectifier circuit is subsequently described in detail in relation to FIG. 7.

A trigger spark gap 31, comprising electrodes 32 and 33, is connected in parallel with rf choke 26. Specifically, electrode 32, which is supported on insulating strip 23, is connected by means of connecting lead 34 to the input end of choke 26. Electrode 33 is supported on electrically conductive flange 35 which extends from outer wall 21 of shield section 11 at a location adjacent strip 23. Outer wall 22, of course, is electrically connected to the other end of choke 26 through inner wall 21. Spark gap 31 extends in a direction perpendicular to the length of strip 23.

Additional spark gaps 40 are provided along the length of the rectifier assembly, one spark gap 40 between each pair of adjacent shield sections. Taking the spark gap 40 between sections 13 and 14 are representative, a pair of spaced spark gap electrodes 41, 42 are provided and are located substantially at the juncture between the outer walls 21 of shield sections. Electrode 41 is supported on a conductive flange 43 extending upward from outer wall 21 of shield section 13 along one side of insulating strip 23; electrode 42 is supported on a conductive flange 44 extending upward from outer wall 21 of shield section 14 along the opposite side of insulating strip 23. Electrodes 41 and 42 are thus connected to respective outer walls 21 of adjacent shield sections. Importantly, spark gap 31 and all of spark gaps 40 are arranged in line of sight of one another. This, as is described in more detail below, enables each spark gap to be fired in response to the ultraviolet emission from the firing of one or the other spark gaps.

The rectifier circuit is divided into identical rectifier sections, each rectifier section connects adjacent shield sections 12 through 17. The rf choke 26 appears at the end of shield section 11. One rectifier section 50 is illustrated schematically in FIG. 5 and is itself subdivided into a plurality of identical series-connected rectifier segments. Each segment includes three series-connected silicon diodes 51, 52 and 53 which are accompensated by respective shunt capacitors 55, 56 and 57 and are connected in series with buffer resistor 54. These seven-component rectifier segments are mounted on respective modular printed circuit boards 58 as illustrated in FIG. 6. Each modular board 58 is mounted on insulating supports with successive boards corresponding to adjacent sides of a square. This square has its sides slightly advanced in pitch so that the overall rectifier section is configured in a four-sided stepped spiral arrangement.

Figure 5:
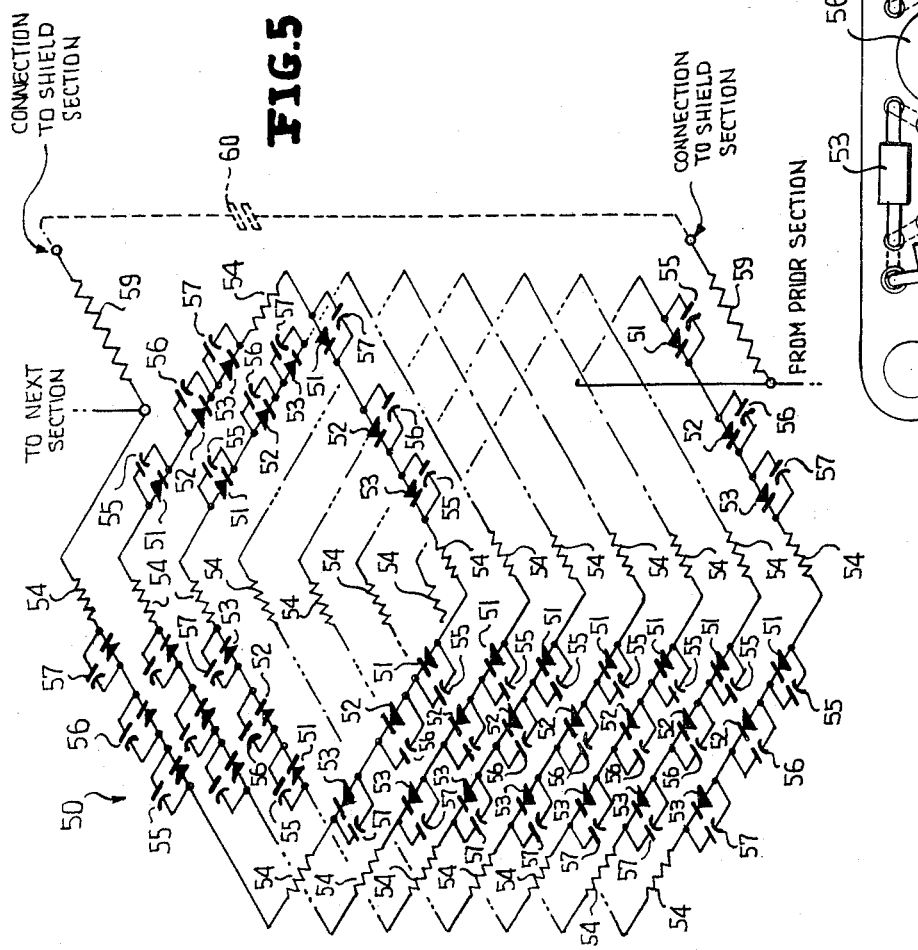
FIG. 5 is a partially schematic view in perspective of a single section of the rectifier circuit of the present invention; illustrating the physical arrangement of circuit components.
Figure 6:
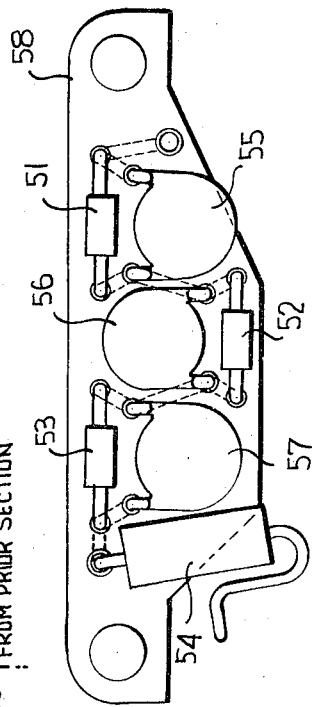
FIG. 6 is a view in plan of a modular printed circuit board of the type employed in the present invention.

In the embodiment illustrated in FIG. 5, 27 modular board rectifier segments are connected in series to constitute the rectifier section. Each rectifier section is separated by a connector board containing isolation resistor 59; the other end of resistor 59 is connected to a conductive shield section. In this manner the rectifier segments in each section are connected in series to form one overall rectifier circuit for the entire multi-section assembly. Moreover, every section has a master ac voltage dividing capacitor paralleling it by means of the capacitor 60 formed by the overlap between adjacent shield sections as described above.

Figure 7:
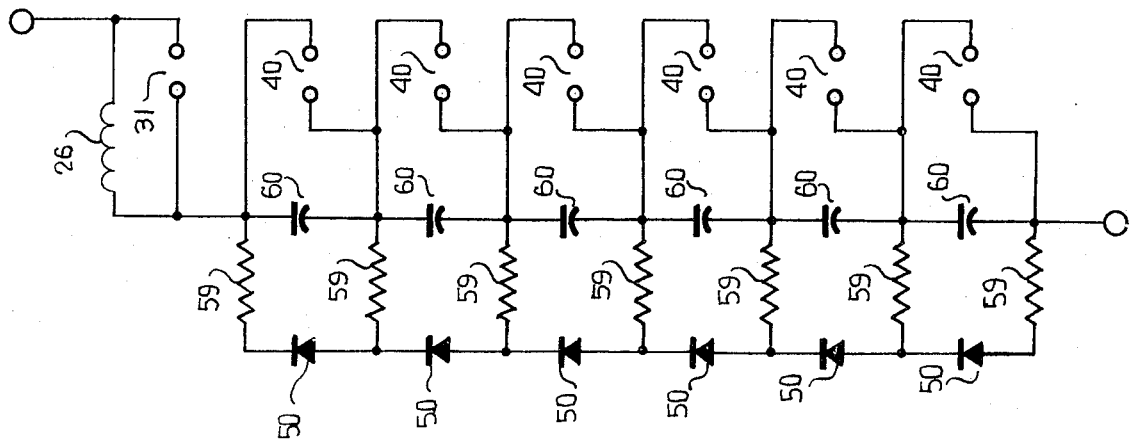
FIG. 7 is a schematic diagram of the overall electrical circuit for the rectifier of the present invention.

A schematic representation of the overall rectifier assembly is provided in FIG. 7 wherein each series connected rectifier section 50 is represented by a respective diode. Isolation resistors 59 couple each rectifier section 50 across a respective shield overlap capacitance 60 which in turn is shunted by a respective spark gap 40. Trigger spark gap 31 is connected in parallel with choke 26 and the combination is connected in series with the chain of capacitances 60.

The rectifier assembly as described thus includes six rectifier sections of 81 diodes each, or a total of 486 series-connected diodes. This number, of course, is not unique but rather is used for a particular embodiment. The actual number of diodes used depends upon the dc voltage to be derived and the ratings of the individual diodes. Importantly, the peak-inverse rating of overall rectifier circuit should be a minimum of three times the derived dc voltage.

The six rectifier sections 50, each housed between respective shield sections 12–17, are connected in series and form a continuous stepped spiral configuration. Each rectifier section 50 is distinguishable from the next by means of a connector board with an isolation resistor 59 which provides the electrical connection to each respective shield section.

The capacitors 55, 56 and 57 which shunt diodes 51, 52 and 52 provide ac compensation; that is, these capacitors assure that the ac voltage applied across the assembly, and any transient voltages, are divided equally among diodes 51, 52, 53.

Resistors 54 serve as a buffer which detunes the Q of the circuit and dampens oscillations and surges during fault conditions. Resistor 59 serves as a dc connection between the rectifier sections 50 and the shield sections, and is of sufficient value to isolate the energy between the two.

The shield sections 11–17 shield the internal rectifier sections 50 from externally created rf interference. Importantly, the overlap between adjacent shield sections on all four sides assures environmental rf disturbances will have negligible effect on the circuit. In addition, the overlap between adjacent shield sections provides the master capacitance chain (capacitors 60) across the entire rectifier assembly; this minimizes distortion of the uniform distribution of ac voltages across each rectifier section 50 as might otherwise occur as a result of external effects. Further, the shield sections 11–17, with their overlap capacitance 60 and parallel spark gaps 40, provide a much shorter path for fault condition transient voltage and current waveforms, thereby eliminating any transmission line effects wherein voltage would distribute according to its wavelength.

Spark gaps 40 limit the peak transient voltage that may exist between shield sections; in so doing they also limit the peak transient voltage across each rectifier section 50. In adition, spark gaps 40 act to by-pass external stored energy away from the individual rectifier sections 50. These spark gaps, being arranged in mutual alignment, permit the ultra-violet light emitted by the firing of one spark gap to stimulate firing of the others.

In the event of excessive voltage built-up in the rectifier assembly, such as might be caused by an electrical discharge, the voltage build-up first appears across choke 26. This is sensed by trigger spark gap 31 which fires and thereby initiates firing of the other spark gaps 40 by ultra-violet stimulation. Since there is little voltage developed across trigger spark gap 31 during normal operation (i.e. - no voltage excess), the gap may be made quite small to thereby enhance break down under transient voltage conditions. The other spark gaps 40 must be set to withstand the normal section to section voltage difference. Since spark gaps 50 are also fired by trigger spark gap 31, their gap setting need not be considered critical. In the particle accelerator of FIG. 1, the trigger gap 31 is arranged to sense sparking between the end of the diode stack and the outer wall 1, specifically near the region of the corona shields. Typically, in such an accelerator, the trigger gap spacing would be on the order 0.008 inch and would be set to fire at between 5,000 to 10,000 volts; this is compared to approximately 100,000 to 200,000 volts appearing across the rectifier assembly. The other gaps 40 would normally carry about 30,000 volts and would be set to fire at slightly above that voltage.

As indicated previously the number of diodes, rectifier sections, shield sections, etc., is a matter of choice, determined primarily by the operating voltages and the ratings of individual components.

It is to be noted that the preferred embodiment includes shield sections of square configuration; however, this is not a necessary configuration and the shields may be rectangular, triangular, circular, elliptical, or otherwise configured. In such cases the configuration of the printed circuit boards or other component mounting members may have to be appropriately reconfigured.

While I have described and illustrated specific embodiments of my invention, it will be clear that variations of the details of construction which are specifically illustrated and described may be resorted to without departing from the true spirit and scope of the invention as defined in the appended claims.

We claim:

1. A high voltage solid-state rectifier assembly, comprising:
   an array of multiple series-connected solid state diodes, said array being divided into groups of said series-connected diodes;
   a plurality of electrically conductive shield sections, each housing a respective group of said diodes, said shield sections being electrically isolated from one another and arranged end to end, each shield section being arranged to overlap the shield section adjacent thereto to provide radio frequency shielding for said array and to form a capacitance element between adjacent shield sections, the capacitive elements between successive shield sections forming a series capacitance chain along the length of said array; and
   a plurality of resistive elements, each connected between a respective group of said diodes and the shield section housing that group to provide a graded potential along said shield sections.

2. The combination according to claim 1 further comprising a plurality of buffer resistors connected in series with said diodes and a plurality of ac-compensation capacitors, each connected across a respective diode.

3. The combination according to claim 1 wherein each shield section is closed along its sides by an electrically conductive wall and open at its ends, one end of said wall including an electrically conductive projection therefrom which extends beyond the end of the next adjacent shield section to form said overlap.

4. The combination according to claim 3 wherein each group of said diodes is supported on insulating support means mounted interiorly of the inner surface of the conductive wall of the shield section which houses that group of said diodes.

5. The combination according to claim 3 wherein said conductive wall is four-sided and wherein said projection is also four-sided and overlaps an ajdacent shield section at all four sides to provide said capacitance element.

6. The combination according to claim 5 wherein each group of diodes is subdivided into series-connected segments of series-connected diodes, each segment mounted on a respective modular printed circuit board, successive series-connected segments being arranged in a stepped spiral-like configuration inside the inner surface of the four-sided wall of the shield section which houses the diodes.

7. The combination according to claim 6 wherein each modular board segment of diodes is arranged along the periphery of a multi-sided, regular geometrically configured structure, each segment stepping forward around the structure to form a stepped-spiral chain of modular boards surrounding an open center region.

8. The combination according to claim 6 wherein each segment of diodes includes plural series-connected diodes connected in series with buffer resistance means, each diode being shunted by a respective ac-compensating capacitor.

9. The combination according to claim 6 further comprising a series of spark gaps, each connected across a respective pair of adjacent shield sections, for limiting peak transient voltages between successive diode groups.

10. The combination according to claim 9 wherein said series spark gaps are mutually aligned to permit the ultra violet emission from the firing of one of said spark gaps to fire the other spark gaps in said series.

11. The combination according to claim 10 further comprising:
an inductor connected in series with said diode array for sensing over-voltage in said array; and
a trigger spark gap connected across said inductor and arranged to fire in response to voltage transients in excess of a predetermined magnitude appearing across said inductor, said trigger spark gap being positioned in alignment with said series of spark gaps such that the ultra-violet light emitted upon firing of said trigger spark gap causes said series of spark gaps to fire.

12. The combination according to claim 1 further comprising a series of spark gaps, each connected across a respective pair of adjacent shield sections, for limiting peak transient voltages between successive diode groups.

13. The combination according to claim 12 wherein said series spark gaps are mutually aligned to permit the ultra violet emission from the firing of one of said spark gaps to fire the other spark gaps in said series.

14. The combination according to claim 13 further comprising:
an inductor connected in series with said diode array for sensing over-voltage in said array; and
a trigger spark gap connected across said inductor and arranged to fire in response to voltage transients in excess of a predetermined magnitude appearing across said inductor, said trigger spark gap being positioned in alignment with said series of spark gaps such that the ultra-violet light emitted upon firing of said trigger spark gap causes said series of spark gaps to fire.

15. A solid-state high voltage rectifier assembly for use as one stage of a multi-stage high voltage dc generator which operates in response to radio frequency source voltage in an environment subject to megavolt transient conditions, said rectifier assembly comprising:
a string of series-connected solid-state diodes, said diodes being chosen such that the total peak inverse voltage rating of said string is at least three times the operational inverse voltage appearing across said string;
ac compensation means connected across each diode in said string;
a plurality of buffer resistors connected in series with said string;
a series of spaced, open-ended, electrically-conductive, radio frequency shield sections arranged in overlapping end-to-end relation to provide a string of series connected capacitance elements, one capacitance element at each shield section overlap, each shield section enclosing a section of said diode string;
a plurality of resistive connections, each connected between a respective shield section and the diode string section enclosed by that shield section to provide a graded dc potential along said series of shield sections;
a series of spark gaps, each connected between a respective pair of adjacent shield sections;
an inductance connected in series with said diode string; and
a trigger spark gap connected across said inductance and set to fire in response to voltage transients of predetermined magnitude across said inductance, said series of spark gaps being positioned in line of sight with said trigger spark gap such that the light energy emitted upon the firing of said trigger spark gap stimulates firing of said series of spark gaps.

16. The combination according to claim 15 wherein said series of spark gaps are arranged in a straight line and in alignment with said trigger spark such that the light energy emitted by firing of any of said spark gaps stimulates firing of the other spark gaps.

17. The combination according to claim 16 wherein said shield sections are four-sided and wherein the section of the diode string housed in each section is arranged in a stepped spiral-like configuration inside the four-sided shield section, successive sections of said diode string being arranged in an overall stepped spiral-like configuration.

18. The combination according to claim 16 wherein said shield sections are regular multi-sided configurations having an inner wall along which a respective portion of said diode string extends in stepped spiral-like fashion.

19. In a high voltage circuit of the type which operates in a high voltage transient environment, protective apparatus comprising:
- a series of spark gaps connected between respective portions of said circuit for preventing build up of undesirably large voltages between said circuit portions;
- voltage sensing means connected in series with said circuit such that a relatively small voltage appears across said sensing means during normal circuit operation and such that voltage transients in said circuit are reflected across said sensing means; and
- a trigger spark gap connected across said voltage sensing means and set to fire in response to voltage transients across said sensing means in excess of a predetermined voltage, said trigger spark gap being positioned in line of sight of and in sufficiently close proximity to said series of spark gaps to permit light energy emitted upon firing said trigger spark gap to stimulate firing of said series of spark gaps.

20. The combination according to claim 19 wherein said trigger spark gap and said series of spark gaps are arranged in a straight line such that light energy emitted upon firing of any of said spark gaps stimulates firing of the other spark gaps.

* * * * *